Patented May 9, 1950

2,507,142

UNITED STATES PATENT OFFICE 2,507,142

STABILIZATION OF POLYMERIC ORGANIC COMPOUNDS

Charles J. Chaban, Toledo, Ohio, assignor, by mesne assignments, to Stabelan Chemical Company, Toledo, Ohio, a partnership No Drawing. Application July 10, 1947, Serial No. 760,115

20 Claims. (Cl. 260—45.7)

The invention relates to the treatment of polymeric organic compounds such as synthetic resins intended for use in various products including transparent, translucent, uncolored, dyed, pigmented or filled films, coatings, filaments and moldings, and particularly to the treatment of polymeric organic compounds with agents that improve their stability and durability.

One of the principal limitations on the usefulness of polymeric organic compounds is their limited resistance to light and heat and their limited stability or durability when subjected to flexing, abrasion or outdoor exposure. Polymerized vinyl compounds, for example, when subjected to outdoor exposure or to an accelerated weathering test or a carbon arc fadeometer test, turn brown or black and become brittle in a relatively short time, particularly when they consist of transparent or translucent films or filaments which are not protected by the opacifying action provided by the presence of fillers or pigments.

The principal object of the invention is to produce a very marked improvement in the light resistance, heat resistance, weather resistance, abrasion resistance and resistance to flexing both at ordinary temperatures and at subnormal temperatures of polymeric organic compounds. More specific objects and advantages are apparent from the description, which merely discloses and illustrates the invention and is not intended to impose limitations upon the claims.

Treatment of a polymeric organic compound in accordance with the present invention is carried out after polymerization of the compound. Such treatment comprises subjecting the polymeric organic compound to intimate contact with an agent which is an inorganic peroxide and an agent which is a metal salt of an acid stronger than metaboric acid and whose one per cent aqueous solution has a pH from about 8 to about 12. As used herein the term "peroxide" includes hydroperoxides and ozonides as well as those compounds ordinarily referred to simply as peroxides.

Although the treatment of a polymeric organic compound in accordance with the invention produces a very marked improvement in the properties of the polymeric organic compound, it does not produce a violent effect like the action of a catalyst during the polymerization of an unsaturated compound. Peroxides have been used as catalysts in the polymerization of unsaturated compounds, but in order to prevent the polymerization from becoming too violent and to prevent inferior polymers from being produced they are used during the polymerization in a concentration that is only a small fraction of the concentration of a peroxide which in the present treatment gives an appreciable improvement in the properties of the organic polymer. Although the concentration of a polymerization catalyst is minute as compared with the concentration of a peroxide used in the present treatment, it heretofore has been considered desirable to remove even the relatively small trace of polymerization catalyst that remains after the polymerization.

The polymeric organic compounds whose properties are improved by the present treatment include chlorinated paraffins, chlorinated rubbers, chlorinated diphenyls and other polymeric halogen-containing organic compounds, and the product of the polymerization of a composition comprising one or more polymerizable organic compounds such as chloroprene, vinyl chloride, vinyl acetate, styrene, vinylidene chloride, methyl methacrylate, ethyl methacrylate, methyl acrylate, acrylonitrile and other derivatives of acrylic acid, ethylene, isobutylene, isoprene, butadiene and other polymerizable unsaturated hydrocarbons. The present treatment is particularly useful in improving the properties of a thermoplastic organic polymer, such as a polymer of a vinyl compound, e. g., a vinyl hydrocarbon or a vinyl ester of an organic acid, and especially in improving the properties of the product of the polymerization of a composition comprising a substance containing a halogen atom and a polymerizable carbon-to-carbon double bond, such as an alpha-halo-substituted ethylene having from one to two alpha-halo substituents, i. e., a vinyl or vinylidene halide such as vinyl chloride, vinyl fluoride or vinylidene chloride. The term "product of the polymerization of a composition comprising a substance containing a polymerizable carbon-to-carbon double bond," as used herein, includes copolymers and synthetic rubbers, as well as modified polymers or reaction products of polymers, such as polyvinyl alcohol, polyvinyl butyral and polyvinyl formal.

The polymeric organic compound may be highly plasticized or unplasticized and may be in the form of a water emulsion, a dispersion in an inactive organic solvent, a dispersion in a plasticizer, or a solution in an active solvent.

The peroxides, i. e., hydroperoxides, ozonides and ordinary peroxides that may be used in the practice of the present invention include hydrogen peroxide, all other inorganic peroxides, and inorganic hydroperoxides and ozonides, such as the peroxides, hydroperoxides and ozonides of light metals such as lithium, sodium, potassium, magnesium, calcium, strontium and barium and heavy metals such as chromium, manganese, iron, copper, zinc, cadmium, aluminum, tin, lead, antimony, titanium and silver. Often it is desirable that a peroxide be accompanied by a trace of a metallic silicate such as magnesium silicate in order to improve the stability of the peroxide. Peroxides of alkaline earth metals such as magnesium, calcium, strontium and barium are particularly useful.

A form of inorganic peroxide that is particularly useful in the practice of the invention is a stable complex of hydrogen peroxide with a metal salt, i. e., a complex that is sufficiently stable so that it does not decompose before being incorporated with the other ingredients used. Such complexes include salts of perboric acid ($HBO_3$) with the metals listed in the preceding paragraph, and particularly sodium and the metals of the second group of the periodic classification, such as:

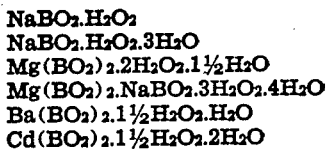

$NaBO_2.H_2O_2$
$NaBO_2.H_2O_2.3H_2O$
$Mg(BO_2)_2.2H_2O_2.1\frac{1}{2}H_2O$
$Mg(BO_2)_2.NaBO_2.3H_2O_2.4H_2O$
$Ba(BO_2)_2.1\frac{1}{2}H_2O_2.H_2O$
$Cd(BO_2)_2.1\frac{1}{2}H_2O_2.2H_2O$ In general, sodium perborate is preferred since it is the most readily and economically obtained commercially, but in some special applications barium and cadmium perborates may be preferred since they appear to impart better electrical properties and to allow a greater degree of transparency in a film of a composition embodying the invention.

The action of the peroxide used in the practice of the present invention is believed to be due in part to its effect upon nascent oxygen. This agent is believed to give up oxygen which combines with the nascent oxygen to produce molecular oxygen. Such elimination of nascent oxygen from a composition comprising a polymeric organic compound is believed to improve the properties of the composition because nascent oxygen, which may be produced by heat and light from molecular oxygen that has entered the composition from the atmosphere, has a tedency to rupture a chain in the compound in which a double bond occurs, with the formation of aldehyde or carboxylic acid groups at the broken ends of the chain. The presence of such broken chains in the compound impairs the properties of the composition and causes it to deteriorate more readily under the influence of heat and light. Thus nascent oxygen, as it is formed from molecular oxygen by the action of heat and light, is reconverted into molecular oxygen which per se is believed to be harmless, and the composition is protected for a considerable period of time against the degrading effect of nascent oxygen. A perborate when used in the practice of the invention may also combine with polymer molecules containing double bonds to produce branch- or cross-polymerization which inhibits the rupturing action of nascent oxygen.

The peroxide used in the practice of the invention may also cause further polymerization to take place after it is incorporated with the molecules of various chain lengths which are included in a polymeric organic compound. Such further polymerization may cause the chain molecules to approach a uniform, equilibrium length which gives the composition improved properties. The equalization of the lengths of the chains may take place by polymerization or combining of the short chains and depolymerization or shortening of the long chains.

Since metaboric acid is a very weak acid, a perborate ordinarily is alkaline, and has an additional beneficial effect because of its alkalinity. Such additional beneficial effect is to neutralize acidity such as the acidity produced by the formation of carboxylic acid groups at the broken ends of the chains when rupturing by the action of nascent oxygen has taken place. Formation of acidity may occur also in the case of an alpha-halo-substituted ethylene or a copolymer thereof and in the case of resinous halogenated hydrocarbons and other halogen-bearing polymers when a hydrogen atom and a halogen atom are split off from two adjacent carbon atoms to form a hydrogen halide, leaving a double bond between the two adjacent carbon atoms. The formation of such double bonds causes darkening of a polymer and may lead to the rupturing of the polymer molecules as explained hereinbefore. The neutralization of such acidity is believed to be beneficial because acidification of a polymer is believed to cause auto-acceleration of the degradation reactions by which the acidity is produced.

The present invention is based upon the discovery that a particularly great improvement in the stability and durability of a polymeric organic compound is produced by the use of a peroxide in combination with an agent which is a metal salt of an acid stronger than metaboric acid and whose one percent aqueous solutions has a pH from about 8 to about 12.

The improvement produced by the conjoint action of these two agents upon the polymeric organic compound is particularly evident in the improved resistance of the polymeric organic compound to the high temperatures necessitated by the usual methods of processing such as mixing, fusing, preheating, calendering, embossing, molding and extruding. One marked effect of the conjoint action of these two agents is a great reduction in the discoloration and embrittlement that occur upon exposure of the polymer organic compound to high temperatures.

When this combination of agents is used, the peroxide serves to stabilize the polymeric organic compound by eliminating nascent oxygen while the other agent serves to stabilize the polymeric organic compound by neutralizing the acidity occurring in the manner hereinbefore explained. Although a perborate when used alone has the effect of neutralizing such acidity, as explained hereinbefore, it has been discovered that the combination of a perborate with the additional agent is much more effective in neutralizing such acidity than a perborate alone. The increased effectiveness in neutralizing acidity that is produced by the presence of the additional agent appears to be due to the fact that such additional agent is a salt of a metal with an acid stronger than metaboric acid, although the greater strength of such acid tends to render the additional agent less alkaline than a perborate.

The use of the combination of agents hereinbefore described renders a polymeric organic compound much more stable than it would be rendered by the use of either agent alone.

Although the additional agent used may be any substance which is a metal salt of an acid stronger than metaboric acid and whose one per cent aqueous solution has a pH from about 8 to about 12 (the most common of which are salts of oxyacids of antimony, arsenic, carbon, chromium, phosphorus, silicon and tin), it is preferable to use a salt of an oxyacid of phosphorus or carbon. The "strength" of an organic or inorganic acid is measured by the dissociation constant ($K_a$) of the acid. There is no particular preferred acid strength (aside from the limitation that the acid be stronger than metaboric acid) since numerous other factors such as the basicity of the metal, the required physical properties of the salt and the method of incorporation of the agents in the composition are equally influential in the selection of the salt for use in the practice of the invention. For example, the preferred salts include not only those of oxyacids of carbon such as carbonic acid ($K_a = 3 \times 10^{-7}$) which is almost as weak as metaboric acid ($K_a = 6 \times 10^{-10}$), but also salts of oxyacids of phosphorus such as orthophosphoric acid ($K_a = 1.1 \times 10^{-2}$) which is substantially stronger than metaboric acid.

A one per cent aqueous solution of the salt must have a pH from about 8 to about 12, and preferably has a pH from about 9 to about 11. The pH may be measured simply by testing in a Beckmann pH meter a one per cent solution of the salt in distilled water, the distilled water having been boiled to remove carbon dioxide before the solution was made up. (The terms "per cent" and "parts," as used herein to refer to quantities of material, mean per cent and parts by weight unless otherwise qualified.)

The additional agent may be a normal or acid salt, a metallo-organic ester or a mixed metal salt of a light or heavy metal such as those hereinbefore mentioned. The preferred salts are those of the alkali and alkaline earth metals, of which sodium and calcium salts are usually the most readily and economically obtained.

A salt (or an acid salt) of an oxyacid of phosphorus which is used as the additional agent in the practice of the invention may be a salt of orthophosphoric acid ($H_3PO_4$), pyrophosphoric acid ($H_4P_2O_7$), triphosphoric acid ($H_5P_3O_{10}$), tetraphosphoric acid ($H_6P_4O_{13}$) or metaphosphoric acid ($HPO_3$) with a light or heavy metal, such as the metals that have been mentioned. The sodium and calcium salts of oxyacids of phosphorus are generally preferred for use as the additional agent, and of this group tricalcium phosphate ($Ca_3(PO_4)_2$) and dibasic calcium phosphate ($CaHPO_4$) are usually preferable, since they are capable of being incorporated into the composition so as to impart excellent stability and, at the same time, to allow extremely high transparency in the final product. Dibasic calcium phosphate (which is slightly less alkaline than tricalcium phosphate) often imparts greater stability than tricalcium phosphate, when used in the practice of the invention. Other salts may be preferred for special purposes (e. g., for imparting certain electrical properties to the composition) or for uses in which the composition is one that need not have such high transparency (e. g., a colored or an opaque composition).

A salt (or an acid salt) of an oxyacid of carbon which is used as the additional agent in the practice of the invention may be a salt of carbonic acid ($H_2CO_3$), or a salt of a monocarboxylic or polycarboxylic acid such as a fatty acid (e. g., formic, acetic or propionic acid), a dicarboxylic aliphatic acid (e. g., oxalic or succinic acid), an unsaturated acid (e. g., maleic or fumaric acid), an ether acid (e. g., diglycolic or dilactic acid), a hydroxy acid (e. g., tartaric or citric acid) or an aromatic acid (e. g., benzoic or phthalic acid).

A metallo-organic ester may be used also as the additional agent in the practice of the invention. The salts of oxyacids of phosphorus or carbon, for example, include a salt of such an acid in whose molecule one or more of the acid hydrogen atoms has been replaced by an organic radical instead of by a metal. The organic radical in such a compound is usually, although not necessarily, that of a comparatively simple monohydric or polyhydric alcohol such as methyl, ethyl or propyl alcohol, ethylene glycol, propylene glycol, diethylene glycol or glycerin. The most common commercially available examples of such compounds include sodium or calcium glycerophosphate, sodium amyl thiophosphonate, sodium salts of phosphated castor oils, sodium capryl phosphate, sodium amyl phosphate and sodium ethyl phosphate.

Often it is desirable to use a combination or mixture of salts as additional agents in the practice of the invention. Such combination may be in the form of a mixed salt, (e. g., $CaNa_2P_2O_7.xH_2O$), or simply in the form of a mixture of two salts (e. g., $Na_2HPO_4.12H_2O$ and $Na_3PO_4.12H_2O$), or in the form of a mixed metallo-organic ester (e. g., sodium potassium ethyl phosphate — $NaKPO_4.C_2H_5$). A mixture of $Na_2HPO_4.12H_2O$ and $Ca_3(PO_4)_2$ when used in the practice of the invention is found to impart excellent properties to a high molecular weight polyvinyl chloride film (see Example 14).

A composition embodying the invention may contain not only more than one such additional agent but also more than one peroxide. On the other hand, the peroxide and the additional agent may be in the form of a single stable complex compound. A preferred type of compound that includes both of the agents is a stable complex of hydrogen peroxide and a salt of a light or heavy metal, such as those hereinbefore mentioned, and preferably an alkali or alkaline earth metal, with an oxyacid of phosphorus or carbon such as the oxyacids hereinbefore mentioned. Examples of such a stable complex include salts of permonophosphoric acid ($H_3PO_5$), perdiphosphoric acid ($H_4P_2O_8$) and percarbonic acid ($H_2C_2O_6$), such as:

$$Na_2CO_3.1\tfrac{1}{2}H_2O_2$$
$$Na_2HPO_4.H_2O_2$$
$$Na_2P_2O_7.3H_2O_2$$

The peroxide may be incorporated in the polymeric organic compound either before, or simultaneously with, or after the incorporation of the other ingredients. The ingredients used in the practice of the invention in each case should be such that the finished composition is slightly or moderately alkaline, i. e., has a pH from about 8 to about 12, although in most cases a composition embodying the invention has a pH at the lower end of such range (i. e., a pH of 7½ to 8). The polymeric organic compound need not be in an alkaline condition before the stabilizing agents are incorporated, since the additional agent tends to render the composition alkaline. The pH of the composition (before or after the addition of the stabilizing agents) may be measured by agitating for five minutes a distilled water suspension of a finely divided sample of the composition and then testing, in a Beckmann pH meter in the customary manner or, more rapidly, by the use of the Gramercy Universal indicator, i. e., by violently shaking a finely divided sample (about 1 gram) of the composition and distilled water (10 ml.) in a test tube for five minutes, adding the Universal Indicator (0.5 ml.), and determining the pH of the water by comparison with the Gramercy color chart. The distilled water should be boiled before use to remove the carbon dioxide.

In many cases it may be desirable to incorporate plasticizers in order to plasticize sufficiently the polymeric organic compound, i. e., to obtain the physical properties, such as flexibility, which are imparted by plasticizers. Such plasticizers include the standard commercial esters and other derivatives of phthalic, sebacic, glycolic, oleic, ricinoleic, toluenesulfonic, stearic and other synthetic fatty acids, the most commonly used of which are compounds such as diethylhexyl phthalate and dibutyl sebacate. The proportion and type of plasticizer used depends entirely upon the physical properties desired in the final product embodying the polymeric organic compound.

The amount of the peroxide or peroxide-containing complex used in the practice of the invention may range from the minimum amount capable of imparting an appreciable improvement in stability (e. g., about one per cent of the polymeric organic compound) to the maximum amount above which there is no important increase in stabilizing effect (e. g., about one-tenth of the polymeric organic compound). Different substances must be added to the same composition in different proportions to give the same results.

The amount of the additional agent used in the practice of the invention may range from the minimum amount capable of imparting an appreciable improvement in stability (e. g., about 0.1 per cent of the polymeric organic compound) to the maximum amount above which there is no important increase in stabilizing effect (e. g., about five per cent of the polymeric organic compound).

Even larger amounts of either agent may be employed when a product of extremely high quality is required for heavy duty service, but usually are not necessary. In actual practice, successive increases in the amount of either agent ordinarily produce smaller and smaller improvements in the properties of the material. The proportion of a given agent to be added to the same composition in order to produce the same results varies with the degree to which the agent is dispersed in the composition, because the effectiveness of each agent increases with the degree of dispersion. The optimum amounts of the agents depend upon the particular agents and polymeric organic compound to be used; for example, in the case of a high molecular weight copolymer of 95 parts of vinyl chloride and 5 parts of vinyl acetate, a mixture of about 3 to 6 parts of

$NaBO_2.H_2O_2.3H_2O$ and about 3 parts of $Ca_3(PO_4)_2$ has been found to impart the best all-around properties.

The stabilizing agents used in the practice of the invention may be of any good commercial grade. They may be either soluble or insoluble in water. Usually they appear to interact to some extent with the polymeric organic compound in that the water-soluble agents ordinarily are relatively inextractable after being dispersed in such compound.

In order to obtain intimate contact between the stabilizing agents and the polymeric organic compound, a thorough dispersion of the agents in the composition is necessary and therefore, it is desirable that the agents be in the form of fine particles. The preferred procedure comprises grinding a mixture of the agents in a ball mill until 100 per cent of the mixture will pass through a standard 100 mesh screen, and then incorporating the mixture of agents in the composition by means of a rubber mill. (The agents referred to in the subsequent examples are ground substantially to the preferred particle size.)

The incorporation of the stabilizing agents in a composition of the invention may be carried out at ordinary temperatures by means of a ball mill when the composition is in solid form, or by means of any desired dispersing apparatus when the composition is in the form of a liquid solution or dispersion. Although the unique stabilizing effect obtained in the practice of the invention is fundamentally due to the conjoint action of the agents themselves, it has been found that the stabilizing effect may be increased even further by particular modes of incorporating the agents in the composition. For example, when a perborate is used in the practice of the invention, it is sometimes desirable to use a hydrate or a salt containing water of crystallization (e. g., $NaBO_2.H_2O_2.3H_2O$ instead of $NaBO_2.H_2O_2$), since the hydrate is more easily dispersed on a rubber mill to obtain a highly transparent composition that forms a clear film. However, a better dispersion of an anhydrous salt is obtained when it is ground with the polymeric organic compound in a ball mill, and a larger amount of the anhydrous salt may be so incorporated in the resin without causing a film of the resulting product to become milky upon exposure to ultra-violet light. Also, it has been found that the best results are obtained by the incorporation of the stabilizing agents at an elevated temperature. The temperature of incorporation may be any temperature that the composition will stand.

Many of the compositions are solids at ordinary temperatures, and ordinarily it is most convenient to incorporate the agents at an elevated temperature at which the composition is soft enough to be worked but viscous enough to keep the agents in suspension. Any desired apparatus, such as a two-roll rubber mill, a Banbury mixer, a ball mill or a three-roll paint mill, may be used for incorporating the agents in the composition. The period of time required to incorporate the agents is simply that necessary to disperse the agents in the composition to the desired degree. If the incorporation is carried out at ordinary temperatures, the properties of the product sometimes may be improved by holding the product at an elevated temperature after the incorporation of the agents. The time required for such a heat treatment decreases as the temperature increases and depends upon whether it is desired to impart the best possible properties to the product or to impart intermediate properties by a shorter heat treatment.

The magnitude and character of the improvement in heat and light resistance produced by treating a composition comprising a polymeric organic compound in accordance with the present invention may be demonstrated by a procedure carried out as follows:

A perborate ($NaBO_2.H_2O_2.3H_2O$) and an additional agent ($Ca_3(PO_4)_2$) are incorporated in a composition consisting of a polymeric organic compound (100 parts of a high molecular weight polyvinyl chloride), a plasticizer (55 parts of di-ethylhexyl phthalate) and a lubricant (1 part of stearic acid) by milling for ten minutes on a two-roll rubber mill at 310° F. and then calendering for five minutes on a three-roll calender at 300–310° F. to produce a film having a thickness of 0.010 inch.

Table 1 (below) shows the results of tests of the films prepared as above described, and more specifically describes the compositions from which the films are produced by specifying the parts of the perborate in the composition (line 2) and the parts of the additional agent in the composition (line 3). For the sake of comparison, test results for control films, i. e., films made from a composition which contains no additional agent (run 1A) are included in Table 1.

The tests employed are standard tests for synthetic film material and are considered to be capable of showing generally the characteristics that are important in industrial film materials of this class. A separate description of the procedure and a manner of obtaining the results in each test follows:

*Transparency (line 4), discoloration (line 5) and dispersion (line 6).*—A film of the composition after it has been processed (i. e., milled and calendered) is visually examined against a background of white and against a background of black. The transparency, which is determined essentially by observation of the film against a black background, is denoted by the following numerical grades:

1. (Excellent.) Completely transparent film.
2. (Very good.) Very slight cloud apparent in the film upon close observation.
3. (Good.) Slight cloud in the film.
4. (Fair.) Cloudy film.
5. (Poor.) Milky film having cloudiness appreciably affecting the transparency.

The discoloration (usually yellowing), which is determined essentially by observation of the film against a white background, is denoted by the following numerical grades:

1. (None.) No discoloration of the film.
2. (Very slight.) Very slight discoloration of the film apparent upon close observation.
3. (Slight.) Noticeable discoloration of the film. The dispersion, which is determined essentially by observation of the film against a black background, is denoted by the following numerial grades:

1. (Excellent.) Completely uniform transparency of the film, with no streaks of discoloration or cloudiness or bubbles.
2. (Very good.) Very few streaks or bubbles in the film, visible only upon close observation.
3. (Good.) A few streaks or bubbles in the film, not sufficient to affect the transparency appreciably.
4. (Fair.) Noticeable streaks or bubbles in the film.

*Heat aging tests at 325° F. (line 7) and at 350° F. (line 8).*—Films of the composition after processing are subjected to a temperature of 325° F. and a temperature of 350° F. in separate convection ovens (in each of which the temperature is controlled by an electrical thermostat) for periods of time such as 15 minutes, 30 minutes, 45 minutes and 60 minutes. The tests determine the resistance of the films to deterioration or aging by the action of heat at each of the two temperatures. The heat resistance at 325° F. (line 7) is denoted by the following numerical grades:

1. (Excellent.) Completely unchanged in transparency and flexibility in 60 minutes.
2. (Very good.) Very slight discoloration (yellowing) and stiffening of the film in 60 minutes.
3. (Good.) Slight discoloration (yellowing) of the film in 60 minutes.
4. (Fair.) Slight discoloration (yellowing) of the film in 45 minutes and noticeable stiffening of the film in 60 minutes.
5. (Poor.) Slight discoloration (yellowing) and stiffening of the film in 30 minutes.

The heat resistance at 350° F. (line 8) is denoted by the following numerical grades:

1. (Excellent.) Moderate discoloration (yellowing) of the film in 60 minutes.
2. (Very good.) Moderate discoloration (yellowing) and slight stiffening of the film in 45 minutes.
3. (Good.) Pronounced discoloration (yellowing) and stiffening of the film in 45 minutes.
4. (Fair.) Moderate discoloration (yellowing) and stiffening of the film in 30 minutes.
5. (Poor.) Pronounced discoloration (yellowing) and stiffening of the film in 30 minutes.

*Fadeometer test (line 9).*—The films of the composition after processing are exposed to ultraviolet light from a carbon arc in an Atlas FDA Fadeometer at 125° F. The test determines the resistance of the film to deterioration by the action of ultra-violet light, and the results given are the hours of exposure required to cause substantial deterioration either in the form of brown spots in the film or in the form of uniform discoloration.

*Accelerated weathering test (line 10).*—The films are tested in a National Carbon model X–1–A unit, and the results obtained are the hours of exposure required to cause substantial deterioration either in the form of brown spots or in the form of uniform discoloration of the film.

*Natural weathering test (line 11).*—The films are exposed to natural weather conditions in Miami, Florida, and the results obtained are the number of ultra-violet hours (calculated on the basis of the "standard ultra-violet hour") of exposure required to cause substantial deterioration of the film as described for the Fadeometer and accelerated weathering tests.

*Table 1*

| 1 | Run Number | 1A | 1B | 1C |
|---|---|---|---|---|
| 2 | Perborate (parts) | 3 | 2 | [1] 2.8 |
| 3 | Additional Agent (parts) | | 0.6 | 1.0 |
| 4 | Transparency (grade) | 4–5 | 3 | 1 |
| 5 | Discoloration (grade) | 2 | 1 | 1 |
| 6 | Dispersion (grade) | 1 | 1 | 1 |
| 7 | Heat Aging; 325° F. (grade) | 4 | 1 | 1 |
| 8 | Heat Aging; 350° F. (grade) | 2 | 1 | 1 |
| 9 | Fadeometer Test (hours) | 4 | 3 | 2 |
| 10 | Accelerated Weathering (hours) | 300 | 500 | 300 |
| 11 | Natural Weathering (Ultra-violet hours) | 300 | 400 | ---- |
| | | 550 | [2] 700 | [2] 400 |

[1] 2.3 parts $NaBO_2.H_2O_2.3H_2O$ and 0.5 part $Ba(BO_2)_2.1\frac{1}{2}H_2O_2.H_2O$.
[2] Still in excellent condition.

The transparency, discoloration and dispersion tests are used to aid in determining the maximum temperature at which the composition may be processed (i. e., without discoloration) and the compatibility of the ingredients in the composition (i. e., as evidenced by the grades of transparency and dispersion). The film properties disclosed in such tests may be altered to some extent by variations in the methods of processing, such as variations in the milling time and temperature, but for the purposes of the invention, the tests serve to demonstrate that the compositions used are capable of being processed at comparatively high temperatures to produce films which meet the standard requirements of industrial film materials.

From Table 1 it can be seen that films from compositions containing both a perborate and the additional agent (runs 1B and 1C) have substantially better dispersion and transparency than the control film (run 1A) which contains no additional agent. This improvement demonstrates one more unique feature of the invention, namely, the fact that the use of the additional agent in combination with a perborate greatly improves the compatibility of the ingredients in the composition. The discoloration of the test films (runs 1B and 1C) is substantially less than that of the control film (run 1A); the reduction in discoloration of the film indicates the improvement in heat stability during processing which is imparted to the film by the incorporation of the additional agent. The improvement in the resistance to deterioration by the action of heat is particularly apparent in the heat aging tests in that the heat resistance of the test films (runs 1B and 1C) is substantially better (both at 325° F. and at 350° F.) than the heat resistance of the control film (run 1A). The results of the tests for determining the resistance to light (Fadeometer, accelerated weathering and natural weathering tests) show that changes in the type of perborate used may substantially affect the light resistance. A comparison of runs 1A and 1B, in which the same perborate is used makes it clear that a substantial improvement in light resistance also is obtained by the use of the combination of a perborate and an additional agent.

The beneficial action of the stabilizing agents used in the practice of the invention cannot be explained on the ground of alkalinity alone; first, because the improvement produced by the incorporation of the present agents is far greater than the improvement that can be produced by the mere incorporation of an alkaline agent and, second, because the improvement involves other phenomena which do not normally accompany the property of alkalinity, e. g., improvements in compatibility and dispersion. On the other hand, since such beneficial action is greater than could be expected merely from a very high degree of dispersion or from the use of an alkaline substance, it is believed that complexes or addition products, perhaps between hydrogen peroxide and the additional agent, are formed whereby the action on nascent oxygen hereinbefore described is strengthened substantially.

It is often desirable to incorporate in the composition other ingredients such as fillers, pigments or opacifiers. In fact, such ingredients may have the effect of "screening" or decreasing the amount of light which may enter the body of the composition, and thereby increasing the resistance of the composition to light. The intended use of the composition comprising the polymeric organic compound determines to a certain extent the agents or ingredients to be incorporated in the composition; but, of course, the ingredients must be compatible in the sense that they are capable of forming a stable suspension, dispersion or solution. Logically, if any substantial quantity of fillers, pigments or opacifiers is used in the composition, the highest degree of compatibility or uniformity may not be required. Since the tests hereinbefore described, which are used for the purpose of determining the properties of films of the compositions, are essentially visual examinations of the films, these tests are less effective for specifically determining such properties as compatibility (i. e., transparency and dispersion), discoloration, heat resistance, and light resistance (i. e., Fadeometer, accelerated weathering and natural weathering tests) when the composition comprising the polymeric organic compound also contains fillers, pigments or opacifiers; and, therefore, the preferred procedure for determining specifically such properties of the compositions consists in the preparation and testing of transparent films.

EXAMPLE 1

Films are prepared by incorporating a peroxide and an additional agent in a composition comprising a polymeric organic compound, for example, a vinyl copolymer, according to the following procedure:

A peroxide (5 parts of $NaBO_2.H_2O_2.3H_2O$) and an additional agent (3 parts of $Ca_3(PO_4)_2$) are incorporated in a composition comprising a polymeric organic compound (a moderately high molecular weight copolymer of 95 parts of vinyl chloride and 5 parts of vinyl acetate), 40 parts of diethylhexyl phthalate, 10 parts of glycol sebacate polyester and 2 parts of butyl cellosolve stearate, by milling for ten minutes on a two-roll rubber mill at 300° F. and calendering for five minutes on a three-roll calender at 300° F. to produce a film having a thickness of 0.010 inch. The film so produced is a clear transparent film having the general appearance characteristics required of films of this class. In the standard heat aging test the results obtained from the film are very good (i. e., grade 2-3) and the film does not discolor or stiffen appreciably until it has been exposed for five hours in a convection oven at 300° F. In the Fadeometer test the film is substantially unchanged in coloring and flexibility after 500 hours of exposure.

If either the peroxide or the additional agent is omitted from the composition, the stability of the composition is greatly reduced. For example, another procedure is carried out that is the same as that described in the foregoing paragraph except that the peroxide is not added and the amount of $CA_3(PO_4)_2$ used is 5 parts instead of 3 parts. The film so produced is a clear, transparent film having the general appearance characteristics required of industrial films of this class, but the heat resistance is considerably reduced in that in the heat aging test the results obtained are only fair (i. e., grade 4-5) and the film discolors and stiffens appreciably after only two hours exposure in a convection oven at 300° F., and the light resistance is reduced to the extent that only 68 hours of exposure in the Fadeometer test are required to cause substantial deterioration.

EXAMPLE 2

A mixture of a vinyl copolymer and a butadiene-acrylonitrile copolymer is treated as follows:

A peroxide (2.65 parts of $NaBO_2.H_2O_2.3H_2O$) and an additional agent (0.8 part of $Ca_3(PO_4)_2$) are incorporated in a composition comprising a polymeric organic compound (a mixture of a medium high molecular weight copolymer of 71 parts of vinyl chloride and 4 parts of vinyl acetate, a copolymer of 4.5 parts of acrylonitrile and 20.5 parts of butadiene, 40 parts of diethylhexyl phthalate, 5 parts of tricresyl phosphate and 1 part of stearic acid) by milling for ten minutes on a two-roll rubber mill at 280–290° F. and then calendering for five minutes on a three-roll calender at 280–290° F. to produce a film having a thickness of 0.010 inch.

The resulting film has very good transparency (i. e., grade 2) and very good dispersion (i. e., grade 2) and very slight discoloration (i. e., grade 2). The results obtained in the heat aging tests are good (i. e., grade 3), and in the Fadeometer test 550 hours of exposure are required to cause substantial deterioration. If either the peroxide or the additional agent is not incorporated in the composition the resistance to heat is decreased in substantially the same manner as described in Example 1.

EXAMPLE 3

A polymeric ethylene compound is treated as follows:

A peroxide (2 parts of $NaBO_2.H_2O_2.3H_2O$) is incorporated in a composition comprising a polymeric ethylene compound (100 parts of polyethylene, 40 parts of polyisobutylene having a molecular weight of about 60,000, and 3 parts of diethylene glycol monostearate) by milling for fifteen minutes on a two-roll rubber mill at 260–280° F. and then calendering for five minutes on a three-roll calender at 240° F. to produce a film having a thickness of 0.010 inch.

If a procedure is carried out that is the same as that described in the foregoing paragraph except that an additional agent (1 part of $Ca_3(PO_4)_2$) is incorporated in the composition, the resulting film is an extremely clear, transparent film having the general appearance characteristics required of industrial films of this class, and when the films are tested the improvement in heat resistance produced by the incorporation of the additional agent is substantially the same as that described in Example 1.

EXAMPLE 4

A butadiene-styrene synthetic rubber is treated as follows:

A peroxide (2 parts of $NaBO_2.H_2O_2.3H_2O$) and an additional agent (0.6 part of $Ca_3(PO_4)_2$) are incorporated in a composition comprising a butadiene-styrene synthetic rubber (a copolymer of 23.5 parts of styrene and 76.5 parts of butadiene), 1 part of stearic acid, 5 parts of tricresyl phosphate, 5 parts of zinc oxide, 1.5 parts of mercapto benzothiazole, 0.25 part of tetraethyl thiuram disulfide, 2 parts of sulfur and 100 parts of clay, by milling the copolymer alone for five minutes and then milling with the other ingredients for ten minutes on a two-roll rubber mill at 180–200° F., and calendering for five minutes on a three-roll calender at 200–220° F. to produce a film having a thickness of 0.010 inch.

The resulting film is vulcanized for two hours at 260° F. to produce an opaque, gray film of excellent quality and appearance. The film so produced shows excellent resistance to heat in that it discolors (turns brown) in a heat aging test much more slowly than a film produced by a procedure that is the same as that given in the example except that either the peroxide or the addition agent is omitted.

EXAMPLE 5

A butadiene-acrylonitrile synthetic rubber is treated as follows:

A peroxide (2 parts of $NaBO_2.H_2O_2.3H_2O$) and an additional agent (0.6 part of $Ca_3(PO_4)_2$) are incorporated in a composition comprising a synthetic rubber (a copolymer of 26 parts of acrylonitrile and 74 parts of butadiene), 35 parts of diethylhexyl phthalate, 5 parts of tricresyl phosphate, 1 part of stearic acid, 2.5 parts of sulfur and 1.5 parts of benzothiazyldisulfide, by milling the copolymer alone for five minutes and then milling with the other ingredients for ten minutes on a two-roll rubber mill at 180–200° F., and calendering for five minutes on a three-roll calender at 200–220° F. to produce a film having a thickness of 0.010 inch.

The resulting film is vulcanized according to the procedure described in Example 4, and the results obtained by testing the films so produced are substantially the same as those given in Example 4.

EXAMPLE 6

A product of the polymerization of a composition comprising one or more alpha-halo-substituted ethylenes having from one to two alpha-halo substituents is treated as follows:

A peroxide (2.7 parts of $NaBO_2.H_2O_2.3H_2O$) and an additional agent (0.8 part of $Ca_3(PO_4)_2$) are incorporated in a composition comprising a copolymer of alpha-halo-substituted ethylenes (a copolymer of 90 parts of vinyl chloride and 10 parts of vinylidene chloride), 45 parts of diethylhexyl phthalate and 1 part of stearic acid by milling for ten minutes on a two-roll rubber mill at 270° F. and then calendering for five minutes on a three-roll calender at 270° F. to produce a film having a thickness of 0.010 inch. The film so produced shows very good transparency (i. e., grade 2) and very good dispersion (i. e., grade 2) and very slight discoloration (i. e., grade 1–2). The heat aging properties of the film are good (i. e., grade 3) and the light resistance of the film is excellent in that 725 hours of exposure in the Fadeometer test or 500 hours of exposure in the accelerated weathering test are required to cause the film to deteriorate substantially.

If either the peroxide or the additional agent is not incorporated in the composition the stability of the resulting film is greatly reduced. For example, a procedure is carried out that is the same as that described in the foregoing paragraph except that no additional agent is used, the amount of peroxide used is 3 parts instead of 2.7 parts, and the amount of plasticizer used is 48 parts instead of 45 parts. The film so produced has substantially poorer resistance to light in that 320 hours of exposure in the Fadeometer test or 275 hours of exposure in the accelerated weathering test are sufficient to cause substantial deterioration.

EXAMPLE 7

Magnesium perborate is used as the peroxide, as follows:

A peroxide (2.8 parts of

$Mg(BO_2)_2.2H_2O_2.1\tfrac{1}{2}H_2O$)

is incorporated in a composition comprising a polymeric organic compound (a high molecular weight copolymer of 95 parts of vinyl chloride and 5 parts of vinyl acetate), 50 parts of diethylhexyl phthalate, 1 part of diethylene glycol monostearate and 1.5 parts of coconut oil, by milling for ten minutes on a two-roll rubber mill at 300° F. and then calendering for five minutes on a three-roll calender at 300° F. to produce a film having a thickness of 0.010 inch.

If a procedure is carried out that is the same as that described in the foregoing paragraph except that an additional agent (1 part of $Ca_3(PO_4)_2$) is incorporated in the composition, the resulting product is a clear, transparent film having the general appearance characteristics required of industrial films of this class, and when tested is found to have heat resistance substantially greater than that of the composition containing no additional agent.

EXAMPLE 8

Barium perborate is used as follows:

A peroxide (2 parts of $Ba(BO_2)_2.1\frac{1}{2}H_2O_2.H_2O$) and an additional agent (0.6 part of $Ca_3(PO_4)_2$) are incorporated in a composition comprising a polymeric organic compound (100 parts of a high molecular weight polyvinyl chloride, 55 parts of diethylhexyl phthalate and 1 part of stearic acid) by milling for ten minutes on a two-roll rubber mill at 310° F. and then calendering for five minutes on a three-roll calender at 300–310° F. to produce a film having a thickness of 0.010 inch. The film so produced is a clear, highly transparent film having excellent (i. e., grade 1) resistance to heat, and having excellent resistance to light in that 300 hours of exposure in the Fadeometer test or 260 hours of exposure in the accelerated weathering test are required to cause substantial deterioration of the film.

If either the peroxide or the additional agent is omitted from the composition, the stability of the composition is greatly reduced. For example, another procedure is carried out that is the same as that described in the foregoing paragraph except that the $Ca_3(PO_4)_2$ is not incorporated in the composition. The film so produced is a clear film having the general appearance characteristics required of industrial films of this class, but both the heat and light resistance are reduced, in that the heat resistance is grade 2, and 185 hours of exposure in the Fadeometer test or 195 hours of exposure in the accelerated weathering test are sufficient to cause substantial deterioration of the film.

EXAMPLE 9

Cadmium perborate is used as follows:

A peroxide (2 parts of $Cd(BO_2)_2.1\frac{1}{2}H_2O_2.2H_2O$) is incorporated in a composition comprising a polymeric organic compound (100 parts of a high molecular weight polyvinyl chloride, 55 parts of diethylhexyl phthalate, 1 part of stearic acid and 3 parts of blown castor oil) by milling for ten minutes on a two-roll rubber mill at 310° F. and then calendering for five minutes on a three-roll calender at 300–310° F. to produce a film having a thickness of 0.010 inch.

If a procedure is carried out that is the same as that described in the foregoing paragraph except that an additional agent (1 part of $Ca_3(PO_4)_2$) is incorporated in the composition, the resulting product is an extremely clear, transparent film, and when the film is tested the improvement in heat resistance produced by the incorporation of the additional agent is substantially the same as that described in Example 8.

EXAMPLE 10

A mixture of perborates is used by carrying out a procedure that is the same as that given in Example 9 except that 1 part of $$Cd(BO_2)_2.1\frac{1}{2}H_2O_2.2H_2O$$

and 2 parts of $NaBO_2.H_2O_2.3H_2O$ are used instead of the 2 parts of $Cd(BO_2)_2.1\frac{1}{2}H_2O_2.2H_2O$. The results obtained are substantially the same as those described in Example 9.

EXAMPLE 11

A metal peroxide is used as follows:

A peroxide (3 parts of $BaO_2$) is incorporated in a composition comprising a polymeric organic compound (a medium high molecular weight copolymer of 90 parts of vinyl chloride and 10 parts of vinyl acetate), 45 parts of diethylhexyl phthalate and 2 parts of diethylene glycol monostearate, by milling for ten minutes on a two-roll rubber mill at 240–250° F. and calendering for five minutes on a three-roll calender at 220–245° F. to produce a film having a thickness of 0.010 inch.

The film so produced shows fair transparency (i. e., grade 4) and fair dispersion (i. e., grade 4). If a procedure is carried out that is the same as that described in the foregoing paragraph except that an additional agent (1 part of $Ca_3(PO_4)_2$) is incorporated in the composition, the resulting film is a clear, transparent film having the general appearance characteristics required of industrial films of this class. When the film is tested, the improvement in heat and light resistance produced by the incorporation of the additional agent is substantially the same as that described in the foregoing examples. Substantially the same results are obtained if other peroxides, hydroperoxides or ozonides are used.

EXAMPLE 12

Hydrogen peroxide is used by carrying out a procedure that is the same as that given in Example 11 except that the peroxide used is a 30 per cent aqueous hydrogen peroxide solution (4 parts) instead of $BaO_2$. The results obtained are similar to those described in the foregoing examples.

EXAMPLE 13

An organic peroxide is used as follows:

A peroxide (1.5 parts of a 30 per cent solution of acetyl peroxide in dimethyl phthalate) and an additional agent (4 parts of sodium borophosphate) are incorporated in a composition comprising a polymeric organic compound (a high molecular weight copolymer of 95 parts of vinyl chloride and 5 parts of vinyl acetate), 45 parts of diethylhexyl phthalate, 5 parts of tricresyl phosphate and 1 part of stearic acid, by milling for ten minutes on a two-roll rubber mill at 300° F. and then calendering for five minutes on a three-roll calender at 300° F. to produce a film having a thickness of 0.010 inch.

The film so produced shows excellent transparency (i. e., grade 1), excellent dispersion (i. e., grade 1) and no discoloration (i. e., grade 1). The film has very high resistance to heat and light, and in the Fadeometer test the film is unchanged after 422 hours of exposure.

EXAMPLE 14

An acid salt of an alkali metal is used as the additional agent by carrying out a procedure that is the same as that given in Example 18 except that $K_2HPO_4$ is used instead of $CaHPO_4$.

The film so produced shows very good transparency (i. e., grade 2), good dispersion (i. e., grade 3) and slight discoloration (i. e., grade 2–3). If either the perborate or the additional agent is omitted from the composition, the stability of the composition is reduced in substantially the same manner as described hereinbefore.

EXAMPLE 15

A mixture of acid and normal salts of a metal is used as follows:

A peroxide (1.8 parts of $NaBO_2.H_2O_2.3H_2O$) and a mixture of additional agents (0.55 part of $Na_2HPO_4.12H_2O$ and 0.55 part of $Na_3PO_4.12H_2O$) are incorporated in a composition comprising a polymeric organic compound (a high molecular weight copolymer of 95 parts of vinyl chloride and 5 parts of vinyl acetate), 45 parts of diethylhexyl phthalate, 5 parts of tricresyl phosphate and 1 part of stearic acid, by milling for ten minutes on a two-roll rubber mill at 300° F. and then calendering for five minutes on a three-roll calender at 300° F. to produce a film having a thickness of 0.010 inch. The film so produced shows excellent transparency (i. e., grade 1), very good dispersion (i. e., grade 2) and no discoloration (i. e., grade 1). In the standard heat aging tests the results obtained from the film are excellent (i. e., grade 1) at 325° F. and very good (i. e., grade 2) at 350° F. In the Fadeometer test the film is slightly discolored, but still flexible, after 600 hours of exposure.

A procedure is carried out that is the same as that described in the foregoing paragraph except that the $Na_3PO_4.12H_2O$ is omitted. The film so produced shows excellent transparency (i. e., grade 1), excellent dispersion (i. e., grade 1) and no discoloration (i. e., grade 1). In the standard heat aging tests the results obtained from the film are very good (i. e., grade 2) at 325° F. and at 350° F. In the Fadeometer test after 643 hours of exposure the film turns yellow but is still flexible.

EXAMPLE 16

A mixture of acid salts and normal salts of different metals is used as follows:

A peroxide (2 parts of $NaBO_2.H_2O_2.3H_2O$) and a mixture of additional agents (2 parts of $Na_2HPO_4.12H_2O$ and 0.6 parts of $Ca_3(PO_4)_2$) are incorporated in a composition comprising a polymeric organic compound (100 parts of a high molecular weight polyvinyl chloride, 55 parts of diethylhexyl phthalate and 0.75 part of stearic acid) by milling for ten minutes on a two-roll rubber mill at 310° F. and then calendering for five minutes on a three-roll calender at 300–310° F. to produce a film having a thickness of 0.010 inch.

The film so produced shows excellent transparency (i. e., grade 1), excellent dispersion (i. e., grade 1) and no discoloration (i. e., grade 1). In the standard heat aging tests the results obtained from the film are excellent (i. e., grade 1) at 325° F. and at 350° F. In the Fadeometer test the film remains unchanged after 1,000 hours of exposure. If a procedure is carried out that is the same as that described in the foregoing paragraph except that the $Ca_3(PO_4)_2$ is omitted, the film so produced has the same properties as those described in the foregoing paragraph except that the dispersion is grade 2 and the heat resistance at 325° F. is grade 2.

EXAMPLE 17

A salt of a heavy metal is used as the additional agent, as follows:

A peroxide (1.5 parts of $$Ba(BO_2)_2.1½H_2O_2.H_2O$$

and an additional agent (1.5 parts of $Pb_3(PO_4)_2$) are incorporated in a composition comprising a polymeric organic compound (a high molecular weight copolymer of 95 parts of vinyl chloride and 5 parts of vinyl acetate), 45 parts of diethylhexyl phthalate, 5 parts of tricresyl phosphate and 1 part of stearic acid, by milling for ten minutes on a two-roll rubber mill at 300° F. and calendering for five minutes on a three-roll calender at 300° F. to produce a film having a thickness of 0.010 inch.

The film so produced shows fair transparency (i. e., grade 4), very good dispersion (i. e., grade 2) and no discoloration (i. e., grade 1). In the standard heat aging test the results obtained from the film are good (i. e., grade 3), and in the Fadeometer test after 350 hours of exposure the film starts to turn yellow but remains flexible.

EXAMPLE 18

A mixed salt of two metals is used as the additional agent, as follows:

A peroxide (2 parts of $NaBO_2.H_2O_2.3H_2O$) and an additional agent (1 part of $CaNa_2P_2O_7.xH_2O$) are incorporated in a composition comprising a polymeric organic compound (a high molecular weight copolymer of 95 parts of vinyl chloride and 5 parts of vinyl acetate), 45 parts of diethylhexyl phthalate, 5 parts of tricresyl phosphate and 1 part of stearic acid, by milling for ten minutes on a two-roll rubber mill at 300° F. and calendering for five minutes on a three-roll calender at 300° F. to produce a film having a thickness of 0.010 inch.

The film so produced shows very good transparency (i. e., grade 2), very good dispersion (i. e., grade 2) and slight discoloration (i. e., grade 2). In the standard heat aging test the results obtained from the film are very good (i. e., grade 2), and in the Fadeometer test the film remains unchanged after 720 hours of exposure.

EXAMPLE 19

A mixed metal-ammonium salt is used as the additional agent, as follows:

An additional agent (2 parts of $MgNH_4PO_4$) is incorporated in a composition comprising a polymeric organic compound (a moderately high molecular weight copolymer of 90 parts of vinyl chloride and 10 parts of vinyl acetate), 45 parts of diethylhexyl phthalate and 3 parts of blown castor oil, by milling for ten minutes on a two-roll rubber mill at 220–240° F. and calendering for five minutes on a three-roll calender at 230–250° F. to produce a film having a thickness of 0.010 inch.

If a procedure is carried out that is the same as that described in the foregoing paragraph except that a peroxide (2 parts of $$NaBO_2.H_2O_2.3H_2O)$$

is incorporated in the composition, the resulting product is an extremely clear, transparent film having the general appearance characteristics required of industrial films of this class, and when the film is tested it is found to be greatly improved in heat and light resistance.

EXAMPLE 20

A mixture of salts of different oxyacids of phosphorus is used as the additional agent, as follows:

A peroxide (2 parts of $NaBO_2.H_2O_2.3H_2O$) and a mixture of additional agents (0.6 part of $Ca_3(PO_4)_2$ and 0.5 part of $Pb(PO_3)_2$) are incorporated in a composition comprising a polymeric organic compound (a high molecular weight copolymer of 95 parts of vinyl chloride and 5 parts of vinyl acetate), 45 parts of diethylhexyl phthalate, 5 parts of tricresyl phosphate and 1 part of stearic acid, by milling for ten minutes on a two-roll rubber mill at 300° F. and then calendering for five minutes on a three-roll calender at 300° F. to produce a film having a thickness of 0.010 inch.

A procedure is carried out that is the same as that described in the foregoing paragraph except that $Pb_3(PO_4)_2$ is used instead of $Pb(PO_3)_2$. Still another procedure is carried out that is the same as that described in the foregoing paragraph except that $Pb_2P_2O_7$ is used instead of $Pb(PO_3)_2$.

The films so produced are tested to determine their heat and light resistance in the manner hereinbefore described.

Table 2 (below) shows the results of the tests of the films so prepared, and specifies the salt of an oxyacid of phosphorus used in the composition (line 1), the grade of transparency of the film (line 2), the grade of dispersion of the film (line 3), the grade of discoloration of the film (line 4), the grade of heat resistance of the film in the heat aging test at 325° F. (line 5) and the number of hours required to cause substantial deterioration of the film in the Fadeometer test (line 6).

Table 2

| 1 | Salt | $Pb(PO_3)_2$ | $Pb_3(PO_4)_2$ | $Pb_2P_2O_7$ |
|---|---|---|---|---|
| 2 | Transparency (grade) | 1-2 | 3-4 | 3-4 |
| 3 | Dispersion (grade) | 3 | 1 | 1 |
| 4 | Discoloration (grade) | 1-2 | 1 | 1 |
| 5 | Heat aging (grade) | 1-2 | 1-2 | 1-2 |
| 6 | Fadeometer (hours) | ¹ 720 | ¹ 640 | ¹ 600 |

¹ Still unchanged.

From Table 2 it can be seen that the heat resistance of the film in each case is nearly excellent (i. e., grade 1), but that the properties of the film such as transparency and dispersion may be altered appreciably by the use of the different additional agents or combinations thereof.

EXAMPLE 21

Another salt of an oxyacid of phosphorus may be used by carrying out a procedure that is the same as that described in the first two paragraphs of Example 25 except that one part of $Ba(PO_3)_2$ is used instead of the mixture of $Pb(PO_3)_2$ and $Ca_3(PO_4)_2$.

The film so produced has very good transparency (i. e., grade 2), excellent dispersion (i. e., grade 1) and very slight discoloration (i. e., grade 2). In the standard heat aging test the results obtained from the film are very good (i. e., grade 2) and in the Fadeometer test the film remains unchanged after 620 hours of exposure.

EXAMPLE 22

A metallo-organic ester is used as the additional agent, as follows:

A peroxide (3 parts of $NaBO_2.H_2O_2.3H_2O$) and an additional agent (1.5 parts of calcium glycerophosphate—$CaPO_4.C_3H_5(OH)_2$) are incorporated in a composition comprising a polymeric organic compound (100 parts of a high molecular weight polyvinyl chloride, 50 parts of diethylhexyl phthalate, 5 parts of tricresyl phosphate and 0.75 part of stearic acid) by milling for ten minutes on a two-roll rubber mill at 310° F. and then calendering for five minutes on a three-roll calender at 300–310° F. to produce a film having a thickness of 0.010 inch.

The film so produced shows very good transparency (i. e., grade 2), excellent dispersion (i. e., grade 1) and very slight discoloration (i. e., grade 1–2). In the standard heat aging tests the results obtained from the film are very good (i. e., grade 2) at 325° F. and at 350° F. In the Fadeometer test the film starts to discolor after about 858 hours of exposure.

A procedure is carried out that is the same as that described in the example except that $NaBO_2.H_2O_2$ is used instead of $NaBO_2.H_2O_2.3H_2O$. The resistance of the film to heat and light is substantially the same as that of the film containing $NaBO_2.H_2O_2.3H_2O$, and the film shows good transparency (i. e., grade 3), fair dispersion (i. e., grade 4) and very slight discoloration (i. e., grade 1–2).

EXAMPLE 23

A mixture of a metallo-organic ester and a normal salt of a metal is used, as follows:

A peroxide (1.8 parts of $NaBO_2.H_2O_2.3H_2O$) and a mixture of additional agents (0.2 part of $CaPO_4.C_3H_5(OH)_2$ and 0.55 part of $Ca_3(PO_4)_2$) are incorporated in a composition comprising a polymeric organic compound (a high molecular weight copolymer of 95 parts of vinyl chloride and 5 parts of vinyl acetate), 45 parts of diethylhexyl phthalate, 5 parts of tricresyl phosphate and 1 part of stearic acid, by milling for ten minutes on a two-roll rubber mill at 300° F. and then calendering for five minutes on a three-roll calender at 300° F. to produce a film having a thickness of 0.010 inch.

The film so produced shows excellent transparency (i. e., grade 1), excellent disperson (i. e., grade 1) and substantially no discoloration (i. e., grade 1–2). In the standard heat aging tests, the results obtained from the film are excellent (i. e., grade 1) at 325° F. and very good (i. e., grade 2) at 350° F. In the Fadeometer test the film starts to discolor after about 532 hours of exposure.

EXAMPLE 24

A mixture of a metallo-organic ester and a salt of a different metal is used by carrying out a procedure that is the same as that described in Example 23 except that $Na_2PO_4.C_3H_5(OH)_2$ (0.2 part) is used instead of $CaPO_4.C_3H_5(OH)_2$.

The film so produced gives test results that are the same as those described in Example 28 except that the film shows no discoloration (i. e., grade 1).

EXAMPLE 25

A more complex metallo-organic ester is used by carrying out a procedure that is the same as that described in Example 23 except that 1 part of commercial "sodium capryl phosphate"—$Na_5(C_6H_{13})_5(P_3O_{10})_2$ is used instead of the mixture of $Ca_3(PO_4)_2$ and $CaPO_4.C_3H_5(OH)_2$.

The film so produced shows very good transparency (i. e., grade 2), very good dispersion (i. e., grade 2) and very slight discoloration (i. e., grade 2). In the standard heat aging test the results obtained from the film are very good (i. e., grade 2), and in the Fadeometer test the film remains unchanged after 600 hours of exposure.

EXAMPLE 26

A metal carbonate is used as the additional agent, as follows:

A peroxide (2.4 parts of NaBO₂.H₂O₂.3H₂O) and an additional agent (0.6 part of Cd(CO₃)₂) are incorporated in a composition comprising a polymeric organic compound (a high molecular weight copolymer of 95 parts of vinyl chloride and 5 parts of vinyl acetate), 50 parts of diethylhexyl phthalate and 1 part of stearic acid, by milling for ten minutes on a two-roll rubber mill at 300° F. and calendering for five minutes on a three-roll calender at 300° F. to produce a film having a thickness of 0.010 inch.

The film so produced shows fair transparency (i. e., grade 4), very good disperson (i. e., grade 2) and very slight discoloration (i. e., grade 2). In the heat aging tests the results obtained from the film are very good (i. e., grade 2) at 325° F. and at 350° F. The light resistance of the film is very good in that substantial deterioration of the film does not take place until about 262 hours of exposure in the Fadeometer test, 287 hours of exposure in the accelerated weathering test or 300 ultra-violet hours of exposure in the natural weathering test (at Miami, Florida).

EXAMPLE 27

Basic lead carbonate is used as follows:
An additional agent (2 parts of

2PbCO₃.Pb(OH)₂ is incorporated in a composition comprising a polymeric organic compound (a medium high molecular weight copolymer of 90 parts of vinyl chloride and 10 parts of vinyl acetate), 45 parts of diethylhexyl phthalate and 3 parts of blown castor oil, by milling for ten minutes on a two-roll rubber mill at 220–240° F. and then calendering for five minutes on a three-roll calender at 230–250° F. to produce a film having a thickness of 0.010 inch.

If a procedure is carried out that is the same as that described in the foregoing paragraph except that a peroxide (2 parts of NaBO₂.H₂O₂.3H₂O)

is incorporated in the composition, the resulting film is a translucent film having the general appearance characteristics required of industrial films of this class, and when the film is tested the improvement in light resistance produced by the incorporation of the combination of the additional agent and the peroxide is similar to that described in previous examples.

EXAMPLE 28

A metal silicate is used as the additional agent, as follows:

A peroxide (1.5 parts of Ba(BO₂)₂.1½H₂O₂.H₂O) and an additional agent (1 part of commercial lead silicate PbSiO₃.1½SiO₂) are incorporated in a composition comprising a polymeric organic compound (a high molecular weight copolymer of 95 parts of vinyl chloride and 5 parts of vinyl acetate), 45 parts of diethylhexyl phthalate, 5 parts of tricresyl phosphate and 1 part of stearic acid, by milling for ten minutes on a two-roll rubber mill at 300° F. and then calendering for five minutes on a three-roll calender at 300° F. to produce a film having a thickness of 0.010 inch.

The film so produced shows fair transparency (i. e., grade 4), very good dispersion (i. e., grade 2) and no discoloration (i. e., grade 1). In the standard heat aging test the results obtained from the film are good (i. e., grade 3). In the Fadeometer test after 350 hours of exposure the film turns yellow but remains flexible.

EXAMPLE 29

A metal acid carbonate is used as the additional agent, as follows:

A peroxide (1.8 parts of NaBO₂.H₂O₂.3H₂O) and an additional agent (0.9 part of NaHCO₃) are incorporated in a composition comprising a polymeric organic compound (a high molecular weight copolymer of 95 parts of vinyl chloride and 5 parts of vinyl acetate), 45 parts of diethylhexyl phthalate, 5 parts of tricresyl phosphate and 1 part of stearic acid, by milling for ten minutes on a two-roll rubber mill at 300° F. and then calendering for five minutes on a three-roll calender at 300° F. to produce a film having a thickness of 0.010 inch.

The film so produced shows excellent transparency (i. e., grade 1), and excellent dispersion (i. e., grade 1) and very slight discoloration (i. e., grade 2). In the standard heat aging test the results obtained from the film are good (i. e., grade 3). In the Fadeometer test the film remains unchanged after 591 hours of exposure.

EXAMPLE 30

Hydrogen peroxide and a metal carbonate are used as the peroxide and the additional agent, according to the following procedure:

A peroxide (1 part of a 30 per cent aqueous hydrogen peroxide solution) and an additional agent (2 parts of Na₂CO₃) are incorporated in a composition comprising a polymeric organic compound (100 parts of a high molecular weight polyvinyl chloride, 50 parts of diethylhexyl phthalate, 5 parts of tricresyl phosphate and 0.75 part of stearic acid) by milling for ten minutes on a two-roll rubber mill at 310° F. and then calendering for five minutes on a three-roll calender at 300–310° F. to produce a film having a thickness of 0.010 inch.

The film so produced shows good transparency (i. e., grade 3), poor dispersion (i. e., grade 5) and slight discoloration (i. e., grade 3). In the heat aging tests the results obtained from the film are very good (i. e., grade 2) at 325° F. and good (i. e., grade 3) at 350° F., and in the Fadeometer test 300 hours of exposure are required to cause substantial deterioration. The test results so obtained, although substantially better than those obtained with a composition from which either the peroxide or the additional agent is omitted, may be improved still more by producing a better dispersion of the agents in the composition.

EXAMPLE 31

A peroxide and an additional agent are used in the form of a stable complex, for example, a percarbonate of a metal, according to the following procedure:

A stable complex of a peroxide and an additional agent (2.65 parts of Na₂CO₃.1½H₂O₂) is incorporated in a composition comprising a polymeric organic compound (a medium high molecular weight copolymer of 95 parts of vinyl chloride and 5 parts of vinyl acetate), 45 parts of diethylhexyl phthalate, 5 parts of tricresyl phosphate and 1 part of stearic acid, by milling for ten minutes on a two-roll rubber mill at 290–300° F. and then calendering for five minutes on a three-roll calender at 290–300° F. to produce a film having a thickness of 0.010 inch.

The film so produced shows excellent transparency (i. e., grade 1), excellent dispersion (i. e., grade 1) and no discoloration (i. e. grade 1). In the heat aging test the results obtained from the film are very good (i. e., grade 2), and in the Fadeometer test substantial deterioration does not take place in 720 hours. Substantially the same results are obtained if other salts of percarbonic acid or mixtures thereof are used.

EXAMPLE 32

Another stable complex of a peroxide and an additional agent, for example, a stable complex of hydrogen peroxide and a metal pyrophosphate, is used by carrying out a procedure that is the same as that given in Example 31 except that $Na_4P_2O_7.3H_2O_2$ (2 parts) is used instead of $Na_2CO_3.1\frac{1}{2}H_2O_2$. The film so produced shows good transparency (i. e., grade 3), good dispersion (i. e., grade 3) and no discoloration (i. e. grade 1). In the heat aging test the results obtained are good (i. e., grade 3), and in the Fadeometer test 450 hours of exposure are required to cause substantial deterioration. Substantially the same results are obtained if a salt of perdiphosphoric acid is used.

Having described my invention, I claim:

1. A method of improving the properties of the product of the polymerization of a composition comprising a substance containing a halogen atom and a polymerizable carbon-to-carbon double bond that comprises subjecting it to intimate contact with (a) from one-hundredth to one-tenth of its weight of an inorganic peroxide and (b) from one-thousandth to one-twentieth of its weight of a metal salt of an acid stronger than metaboric acid whose one per cent aqueous solution has a pH from about 8 to about 12.

2. A method of improving the properties of the product of the polymerization of a composition comprising an alpha-halo-substituted ethylene having from one to two alpha-halo substituents that comprises subjecting it to intimate contact with (a) from one-hundredth to one-tenth of its weight of an inorganic peroxide and (b) from one-thousandth to one-twentieth of its weight of a metal salt of an acid stronger than metaboric acid whose one per cent aqueous solution has a pH from about 8 to about 12.

3. A method of improving the properties of the product of the polymerization of a composition comprising an alpha-halo-substituted ethylene having from one to two alpha-halo substituents that comprises subjecting it to intimate contact with (a) from one-hundredth to one-tenth of its weight of a perborate of a metal, and (b) from one-thousandth to one-twentieth of its weight of a metal salt of an acid stronger than metaboric acid whose one per cent aqueous solution has a pH from about 8 to about 12.

4. A method as claimed in claim 3 in which the metal salt is a metal salt of an oxyacid of phosphorus.

5. A method as claimed in claim 3 in which the metal salt is a metal salt of an oxyacid of carbon.

6. A method of improving the properties of the product of the polymerization of a composition comprising an alpha-halo-substituted ethylene having from one to two alpha-halo substituents that comprises subjecting it to intimate contact with (a) from one-hundredth to one-tenth of its weight of an inorganic peroxide and (b) from one-thousandth to one-twentieth of its weight of a metal salt of an oxyacid of phosphorus whose one per cent aqueous solution has a pH from about 8 to about 12.

7. A method as claimed in claim 6 in which the peroxide and the metal salt are in the form of a stable complex consisting of a perphosphate of a metal.

8. A method of improving the properties of the product of the polymerization of a composition comprising an alpha-halo-substituted ethylene having from one to two alpha-halo substituents that comprises subjecting it to intimate contact with (a) from one-hundredth to one-tenth of its weight of an inorganic peroxide and (b) from one-thousandth to one-twentieth of its weight of a metal salt of an oxyacid of carbon whose one per cent aqueous solution has a pH from about 8 to about 12.

9. A method as claimed in claim 8 in which the peroxide and the metal salt are in the form of a stable complex consisting of a percarbonate of a metal.

10. A composition of improved stability and durability including the product of the polymerization of a composition comprising a substance containing a halogen atom and a polymerizable carbon-to-carbon double bond, and, intimately incorporated therewith, (a) from one-hundredth to one-tenth of its weight of additional inorganic peroxide and (b) from one-thousandth to one-twentieth of its weight of a metal salt of an acid stronger than metaboric acid whose one per cent aqueous solution has a pH from about 8 to about 12.

11. A composition of improved stability and durability including the product of the polymerization of a composition comprising an alpha-halo-substituted ethylene having from one to two alpha-halo substituents, and, intimately incorporated therewith, (a) from one-hundredth to one-tenth of its weight of additional inorganic peroxide and (b) from one-thousandth to one-twentieth of its weight of a metal salt of an acid stronger than metaboric acid whose one per cent aqueous solution has a pH from about 8 to about 12.

12. A composition of improved stability and durability including the product of the polymerization of a composition comprising an alpha-halo-substituted ethylene having from one to two alpha-halo substituents, and, intimately incorporated therewith, (a) from one-hundredth to one-tenth of its weight of additional perborate of a metal, and (b) from one-thousandth to one-twentieth of its weight of a metal salt of an acid stronger than metaboric acid whose one per cent aqueous solution has a pH from about 8 to about 12.

13. A composition as claimed in claim 12 in which the metal salt is a metal salt of an oxyacid of phosphorus.

14. A composition as claimed in claim 12 in which the metal salt is a metal salt of an oxyacid of carbon.

15. A composition of improved stability and durability including the product of the polymerization of a composition comprising an alpha-halo-substituted ethylene having from one to two alpha-halo substituents, and, intimately incorporated therewith, (a) from one-hundredth to one-tenth of its weight of additional inorganic peroxide and (b) from one-thousandth to one-twentieth of its weight of a metal salt of an oxyacid of phosphorus whose one per cent aqueous solution has a pH from about 8 to about 12.

16. A composition as claimed in claim 15 in which the peroxide and the metal salt are in the form of a stable complex consisting of a perphosphate of a metal.

17. A composition of improved stability and durability including the product of the polymerization of a composition comprising an alpha-halo-substituted ethylene having from one to two alpha-halo substituents, and, intimately incorporated therewith, (a) from one-hundredth to one-tenth of its weight of additional inorganic peroxide and (b) from one-thousandth to one-twentieth of its weight of a metal salt of an oxyacid of carbon whose one per cent aqueous solution has a pH from about 8 to about 12.

18. A composition as claimed in claim 17 in which the peroxide and the metal salt are in the form of a stable complex consisting of a percarbonate of a metal.

19. A method of improving the properties of a halogen-containing product of the polymerization of a composition comprising a substance containing a polymerizable carbon-to-carbon double bond that comprises subjecting it to intimate contact with (a) from one-hundredth to one-tenth of its weight of an inorganic peroxide and (b) from one-thousandth to one-twentieth of its weight of a metal salt of an acid stronger than metaboric acid whose one per cent aqueous solution has a pH from about 8 to about 12.

20. A composition of improved stability and durability including a halogen-containing product of the polymerization of a composition comprising a substance containing a polymerizable carbon-to-carbon double bond, and, intimately incorporated therewith, (a) from one-hundredth to one-tenth of its weight of additional inorganic peroxide and (b) from one-thousandth to one-twentieth of its weight of a metal salt of an acid stronger than metaboric acid whose one per cent aqueous solution has a pH from about 8 to about 12.

CHARLES J. CHABAN.

REFERENCES CITED

The following references are of record in the file of this patent:

UNITED STATES PATENTS

| Number | Name | Date |
| --- | --- | --- |
| 2,179,973 | Alexander | Nov. 14, 1939 |
| 2,218,645 | Japs | Oct. 22, 1940 |
| 2,307,075 | Quattlebaum | Jan. 5, 1943 |
| 2,432,448 | Richards | Dec. 9, 1947 |
| 2,438,102 | Cox | Mar. 16, 1948 |
| 2,438,480 | Stanton | Mar. 23, 1948 |
| 2,462,674 | Rehner | Feb. 22, 1949 |

OTHER REFERENCES

Mast et al., Ind. Eng. Chem. 36, pages 1022–1027 (1944).